United States Patent [19]
Lee et al.

[11] Patent Number: 5,570,340
[45] Date of Patent: Oct. 29, 1996

[54] DISK RECORDING MEDIUM AND METHOD WHICH USES AN ORDER TABLE TO CORRELATE STORED PROGRAMS

[75] Inventors: Deok-hyun Lee, Seoul; Rae-hwan Lee, Suwon, both of Rep. of Korea

[73] Assignee: Samsung Electronics Co., Ltd., Kyungki-do, Rep. of Korea

[21] Appl. No.: 455,069

[22] Filed: May 31, 1995

[30] Foreign Application Priority Data

May 31, 1994 [KR] Rep. of Korea ...................... 94-12155
May 31, 1994 [KR] Rep. of Korea ...................... 94-12156
May 31, 1994 [KR] Rep. of Korea ...................... 94-12157
May 31, 1994 [KR] Rep. of Korea ...................... 94-12158

[51] Int. Cl.$^6$ .............................. G11B 7/24; G11B 5/09
[52] U.S. Cl. ........................... 369/275.3; 369/48
[58] Field of Search .................... 369/275.3, 48, 369/47, 54, 58, 32, 59, 275.2; 358/343, 342, 341, 335; 360/19.1

[56] References Cited

U.S. PATENT DOCUMENTS

| | | | |
|---|---|---|---|
| 5,177,720 | 1/1993 | Kondo | 369/48 |
| 5,208,679 | 5/1993 | Yamauchi et al. | 358/342 |
| 5,243,582 | 9/1993 | Yamauchi et al. | 369/48 |
| 5,390,159 | 2/1995 | Schylander | 369/48 |
| 5,414,686 | 5/1995 | Iitsuka | 369/48 |

FOREIGN PATENT DOCUMENTS 0165320  12/1985  European Pat. Off. .

*Primary Examiner*—Tan Dinh
*Attorney, Agent, or Firm*—Sughrue, Mion, Zinn, Macpeak & Seas

[57] ABSTRACT

A disk recording medium has a lead-in area, a program area and a lead-out area. The program area includes a first table area where a first index table consisting of a plurality of first indices and address data is recorded, a second table area where a second index table consisting of a plurality of second indices and address data is recorded, a first data area where a plurality of first programs consisting of first data are recorded according to an index of the plurality of first indices of the first index table, and a second data area where a plurality of second programs consisting of second data and an index table of the first programs related to the second data are recorded according to an index of the plurality of second indices of the second index table. The reproduction method reproduces the data of the program selected from a disk recording medium having the above record format, to thereby record thousands of programs onto a single disk, directly access a large amount of programs without an operating or application system, and enable high speed accessing.

12 Claims, 10 Drawing Sheets

FIG. 1 (PRIOR ART)

|   | 1 2 3 4 | 5 6 7 8 | 9 10 11 12 13 14 15 16 |
|---|---|---|---|
| 1 | CONTROL | ADDRESS | TNR |
| 17 | POINTER | | MIN |
| 33 | SEC | | FRAME |
| 49 | ZERO | | PMIN |
| 65 | PSEC | | PFRAME |
| 81 | CRC CODE | | |

FIG. 2

| FRAME NO. | POINTER | PMIN | PSEC | PFRAME |
|---|---|---|---|---|
| n<br>n+1<br>n+2 | 01<br>01<br>01 | DMA 1st TRACK<br>START ADDRESS | | |
| n+3<br>n+4<br>n+5 | A0<br>A0<br>A0 | 1st TRACK<br>START ADDRESS | | |
| n+6<br>n+7<br>n+8 | A1<br>A1<br>A1 | LAST TRACK<br>START ADDRESS | | |
| n+9<br>n+10<br>n+11 | A2<br>A2<br>A2 | LOA START ADDRESS | | |

FIG. 3
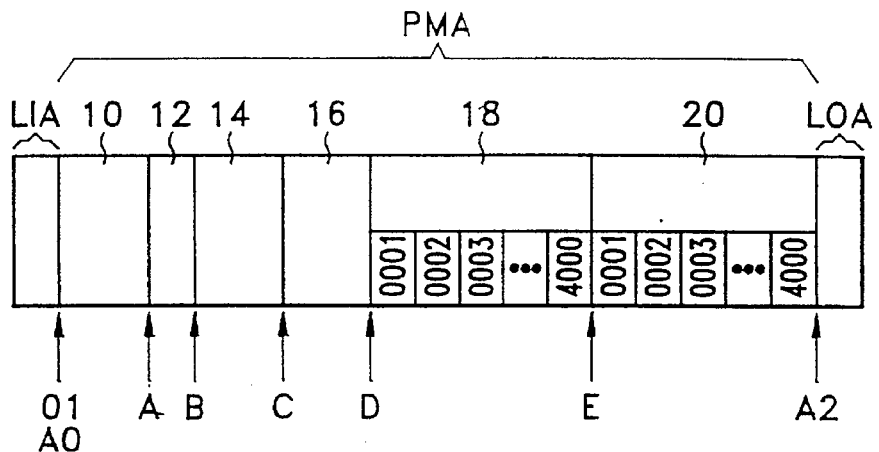
FIG. 4
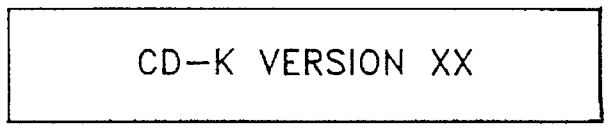
FIG. 5
| INDEX | MIN | SEC | FRAME | GROUP | |
|---|---|---|---|---|---|
| 0001 | 00 | 02 | 47 | 00 | |
| 0002 | 00 | 03 | 40 | 01 | |
| 0003 | 00 | 04 | 41 | 01 | |
| 0004 | 00 | 05 | 36 | 01 | GROUP 1 |
| 0005 | 00 | 06 | 19 | 01 | |
| 0006 | 00 | 07 | 12 | 01 | |
| 0007 | 00 | 08 | 05 | 01 | |
| 0008 | 00 | 09 | 02 | 00 | |
| ⋮ | ⋮ | ⋮ | ⋮ | ⋮ | |
| 4000 | WW | WW | WW | 01 | |
FIG. 6
| INDEX | MIN | SEC | FRAME | GROUP |
|---|---|---|---|---|
| 0001 | XX | XX | XX | XX |
| 0002 | XX | XX | XX | XX |
| 0003 | XX | XX | XX | XX |
| ⋮ | | | | |
| 4000 | XX | XX | XX | XX |

DISK RECORDING MEDIUM AND METHOD WHICH USES AN ORDER TABLE TO CORRELATE STORED PROGRAMS

BACKGROUND OF THE INVENTION

The present invention relates to a disk recording medium and a reproduction method using the same, and more particularly, to a compact disk (CD) having a new signal format and a reproducing method using the same.

A compact disk (CD) is a recording medium having a diameter of 12 cm where a large capacity (maximum 800 megabytes) digital data signal which is optically modulated can be stored. Various types of CDs include an audio exclusive-use CD-DA (digital audio) for recording digital audio data; CD-G (graphics) and CD-EG (enhanced graphics) for recording digital audio data, character data and graphics data so as to provide music, lyrics and a graphics video image such as a background screen; and video CDs for recording digital audio data together with digital video data. In addition, a CD-ROM records computer data to be used as a database and for electronic publishing, and CD-I (interactive) records audio, video, character and computer data to be used in a multi-media system.

The physical recording formats of such CDs are based on a CD-DA recording format. The data recording area of a CD can be roughly divided into the lead-in area (LIA), program area (PMA) and lead-out area (LOA). In the case of CD-DA, a digital audio data signal is recorded into the PMA and time-related program information, i.e., the table of contents (TOC) data, is recorded into the LIA. Accordingly, prior to reproduction, a CD reproduction apparatus seeks a selected program by means of reading the TOC data recorded in the LIA and reproduces the corresponding program. The LIA has eight sub-code channels such as P, Q, R, S, T, U, V and W. The "TOC" data uses the Q-channel to indicate a musical piece, program number and index for up to 99 programs. A CD-G employs the R through W sub-code channels (not used by the CD-DA) in order to add a graphics function for displaying lyrics and a song-related image, e.g., for a karaoke machine. In the case of the CD-DA and CD-G, programs in the PMA are searched with reference to the TOC in LIA, and thus the number of programs recordable in the PMA is limited. For example, since the maximum capacity for one CD is 800 Mb, 8,000 pictures of a 100 Kb still image can be recorded, but a TOC of 8,000 pictures cannot be entirely recorded in the LIA. In the case of CD-ROMs and CD-Is, an audio data block which consists of 98 frames, i.e., the data processing segment of a CD-DA, is re-constructed into sector units and data is recorded or processed in sector units. A CD-ROM driver is connected to a host computer (usually, a personal computer) and performs a reproduction operation depending on the CD-ROM operating program loaded onto a hard disk or a floppy disk of the host computer. Therefore, a CD-ROM requires a specific host computer and compatibility between systems, which impedes its widespread use. To overcome such drawbacks of the CD-ROM, a CD-I reproduction apparatus incorporates a computer, a character reproduction circuit, an image reproduction circuit, a sound reproduction circuit and a computer data reproduction circuit therein, to thereby completely satisfy inter-system compatibility. That is, a CD-I reproduction apparatus is a reproduction-only computer in which a hard disk or a floppy disk is replaced by a CD-I disk. In such a CD-I reproduction apparatus, similar to a computer, practical data accessing is possible only by an application program loaded in a disk under an operating system (OS) environment. Thus, a specific operating system and an application program are absolutely required and costs are higher due to the need to develop specialized software. In addition, a computer cannot directly access the location of data recorded on a disk and must perform all data accessing operations through an OS or application program.

SUMMARY OF THE INVENTION

Accordingly, it is a first object of the present invention to provide a disk recording medium for recording a large quantity of programs and enabling data accessing at a micro-computer level without a specific operating system or application program.

It is a second object of the present invention to provide a data reproduction method for directly accessing program data from a disk medium.

To accomplish the first object of the present invention, there is provided a disk recording medium (embodiment 1) having a lead-in area, a program area and a lead-out area, wherein the program area comprises:

a first table area whose start address is a first address value determined by the start address of the program area and where a first index table consisting of a plurality of first indices and address data is recorded;

a second table area whose start address is a second address value determined by the start address of the program area and where a second index table consisting of a plurality of second indices and address data is recorded;

a first data area where a plurality of first programs whose start address is determined by address data of the corresponding first index among the first indices of the first table area consisting of first data are recorded according to an order of the plurality of first indices of the first index table; and a second data area where a plurality of second programs whose start address is determined by address data of the corresponding second index among the second indices of the second table area consisting of second data and an order table of the first programs related to the second data are recorded according to an index of the plurality of second indices of the second index table.

There is provided a method for playing back a disk recording medium (of embodiment 1) having a lead-in area, a program area comprising first and second table areas and first and second data areas, and a lead-out area, the method comprising the steps of:

reading TOC data from the lead-in area of the disk recording medium to obtain start address data of the program area, reading first and second index tables from the first and second table areas having first and second start addresses predetermined by the start address data, and respectively storing the first and second index tables in first and second memories;

reading an address of a second index corresponding to a selected number with reference to the second index table stored in the second memory, reading a corresponding second program having the read address of the second index as a start address from the second data area, and storing the corresponding second program in a third memory;

reading a first index according to an order table of the corresponding second program stored in the third memory, reading an address of the first index with reference to the first index table in the first memory, reading a corresponding first program having the read address of the first index as a start address from the first data area, and storing the corresponding first program in a fourth memory; and performing digital-to-analog conversion on second data of the second program stored in the third memory and on first data of the first program stored in the fourth memory, and synchronizingly outputting the converted first and second analog signals.

There is provided a disk recording medium (embodiment 2) having a lead-in area, a program area and a lead-out area, wherein the program area comprises:

a table area whose start address is a first address value determined by the start address of the program area, and where an index table consisting of a plurality of indices and address data is recorded;

a first data area for recording a plurality of second programs whose start address is address data of the corresponding index among the plurality of indices of index tables of the table area, consisting of first data according to an order of the plurality of indices of the index table; and a second data area for recording a plurality of second programs consisting of second data and an order table of the first programs related to the second data and having a predetermined size, start address of each of the plurality of second programs being a second address value determined by the start address of the program area.

There is provided a method for playing back the disk recording medium (of embodiment 2), the method comprising the steps of:

reading TOC data from the lead-in area of the disk recording medium to obtain start address data of the program area, reading an index table from the table area having a start address determined by the start address data of the program area, and storing the index table in a first memory;

calculating a start address MAi of a second program corresponding to a selected number i by the equation $MAi=C+S(i-1)$ where C is a predetermined start address value of the second data area and S is the constant size of the respective second programs;

reading the second program having the calculated address value as a start address from the second data area, and storing the read second program in a second memory;

reading an index of a first program according to an order table of the second program stored in the second memory, reading a start address of the first program corresponding to the read index with reference to the index table stored in the first memory, reading the first program having the read address as a start address from the first data area, and storing the read first program in a third memory; and performing digital-to-analog conversion on second data of the second program stored in the second memory and on first data of the first program stored in the third memory, and synchronizingly outputting the converted first and second analog signals.

There is provided a disk recording medium (embodiment 3) having a lead-in area, a program area and a lead-out area, wherein the program area comprises:

a table area whose start address is a first address value determined by the start address of the program area, and where an index table having a predetermined first size (S) and consisting of a plurality of indices and address data is recorded;

a first data area for recording a plurality of first programs, each of the first programs having a predetermined second size (SS) and consisting of first data; and a second data area for recording a plurality of second programs consisting of second data and an order table of the first programs related to the second data whose start address of each second program is determined by address data of the corresponding index among the plurality of indices of index tables of the table area according to an order of a plurality of indices of the index table.

There is provided a method for reproducing the disk recording medium (of embodiment 3), the method comprising the steps of:

reading TOC data from the lead-in area of the disk recording medium to obtain start address data of the program area, reading an index table from the table area having a start address determined by the start address data of the program area, the index table having a predetermined size, and storing the index table in a first memory;

reading an address of the index corresponding to a selected number with reference to the index table stored in the first memory, reading a second program having the read address as a start address from the second data area, and storing the read second program in a second memory;

reading an order of a first program according to an order table of the second program stored in the second memory, calculating a start address (PAi) of the first program of the order (i) given from start address of the table area by the equation $PAi=S+SS(i-1)$ where SS is a predetermined size of each of the first programs, reading the first program having the calculated address as a start address from the first data area, and storing the read first program in a third memory; and performing digital-to-analog conversion on second data of the second program stored in the second memory and on first data of the first program stored in the third memory, and synchronizingly outputting the converted first and second analog signals.

There is provided a disk recording medium (embodiment 4) having a lead-in area, a program area and a lead-out area, wherein the program area comprises:

a first data area where a plurality of first programs consisting of first data having a predetermined size are recorded, each of first programs being a second address value determined by the start address of the program area; and a second data area for recording a plurality of second programs consisting of second data and an order table of first programs related to the second data and having a predetermined size, and start address of each of the second programs being a second address value determined by the start address of the program area.

There is provided a reproduction method of a disk recording medium (of embodiment 4), the method comprising the steps of:

reading TOC data from the lead-in area of the disk recording medium to obtain start address data of the program area;

reading the second program (MAj) of the "j"th entry from the second data area having a second start address (C) determined by the start address, calculating an address of a selected second program (MAj) by the equation $$MAj=C+s2(j-1)$$

where S2 is the size of the respective second programs, and storing the read second program in a first memory;

reading an order (i) of a first program according to an order table of second programs stored in the first memory, calculating an address (PAi) of a first program (Pi) corresponding to the read order by the equation $$PAi=B+S1(i-1)$$

where S1 is the size of the first program, reading the first program (Pi) of the "i"th entry from the first data area having a first start address (B) determined by the start address, and storing the read first program in a second memory; and performing digital-to-analog conversion on the second data of the second program stored in the first memory and on the first data of the first program stored in the second memory, and synchronizingly outputting the converted first and second analog signals.

BRIEF DESCRIPTION OF THE DRAWINGS

The above objects and other advantages of the present invention will become more apparent by describing in detail preferred embodiments thereof with reference to the attached drawings in which:

FIG. 1 illustrates data structure of a Q sub-code channel of a compact disk;

FIG. 2 illustrates a format of a TOC of a Q sub-code channel of the present invention;

FIG. 3 illustrates a format of a program area of a compact disk of embodiment 1 of the present invention;

FIG. 4 illustrates a format of the disk description area of FIG. 3;

FIG. 5 illustrates a format of a first index table recorded in the first table area of FIG. 3;

FIG. 6 illustrates a format of a second index table recorded in the second table area of FIG. 3;

DETAILED DESCRIPTION OF THE INVENTION

Figure 7:
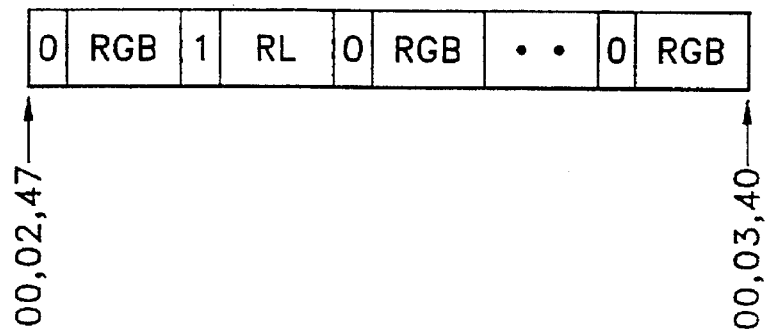
FIG. 7 illustrates data coding of a first program recorded in the first data area of FIG. 3.

The present invention will be explained in more detail with reference to the attached drawings.

A disk recording medium of the present invention includes a lead-in area (LIA), program area (PMA) and a lead-out area (LOA), similar to a conventional CD-DA disk. FIG. 1 shows a Q-channel data structure in the lead-in area. The 98-bit Q-channel data structure consisting of the second channel bits among the eight channels of P, Q, R, S, T, U, V and W of 98 frames is made up of 96-bits and two synchronization bits. There are four control bits, four address bits and 72 data bits. The data bits include an 8-bit track number code (TNR), an 8-bit pointer, a 24-bit address (MIN, SEC, FRAME), an 8-bit space bit (ZERO), and a 24-bit pointer address (PMIN, PSEC, PFRAME). Following the data bits, there is a 16-bit CRC code. The track number code (TNR) of the Q-channel in the LIA is "00" (decimal). A list of the contents recorded on a disk, i.e., the table of contents (TOC), is recorded in the LIA. TOC data consists of a Q-channel pointer and the pointer address that represents the minutes, seconds, and frame value of the starting pointer of each program of the PMA having a specific number of tracks.

FIG. 2 illustrates an example of a TOC of the present invention. If the pointer value is "01," minutes data of PMIN represents an initial address of a first track of a program area If the pointer value is "A0," PMIN represents the first track number of the program area, and if the pointer value is "A1," PMIN represents the last track number of the program area. If the pointer value is "A2," minutes data of PMIN represents a start address of LOA. Accordingly, as described above, the number of tracks in the TOC is one, and the values of pointers 01, A0 and A1 are all the same.

In the present invention, the following four embodiments can be constructed according to table construction of program area. The four embodiments will be explained as follows.

Embodiment 1

Referring to FIG. 3, PMA of embodiment 1 of the present invention includes a disk label area 10 of CD-ROM, a disk area 12, a first table area 14, a second table area 16, a first data area 18 and a second data area 20. In addition, at least one CD-DA track can be provided between the second data area and LOA. For such a case, a pointer and address of the track are additionally provided to TOC. Here, disk label area 10 adopts the ISO9660 format for defining a well-known CD-ROM format.

Referring to FIG. 4, disk area 12 has an absolute address which is a predetermined time interval from a start address of the program area, i.e., 00 minutes, 00 seconds and 00 frame, as a start address (A), and disk discrimination data of "CD-K VERSION XX" and a version number are recorded by ASCII code. Disk area 12 consists of two sectors having mode 1 of CD-ROM format.

Referring to FIG. 5, first table area 14 consists of a table having number, start address and characteristics data of each first program of first data area 18. First table area 14 includes a start address (B). Each start address of a first program consists of a two-byte index, one byte of minutes data, one byte of seconds data and one byte of frame data. The 1-byte characteristics data is for displaying a group of first programs, as is shown in FIG. 5. Here, "00" indicates a start of the group and "01" indicates a continuation of the group. Therefore, the number of required sectors can be expressed as follows:

(6 bytes×4,000 programs)/2048=11.78

Thus, 12 sectors are required for mode 1.

Referring to FIG. 6, second table area 16 consists of a table having number, start address and characteristics data of each second program of second data area 20. Second table area 16 includes a start address (C). Each start address of the second program consists of 2-byte index, 1-byte minutes, 1-byte seconds and 1-byte frame. The characteristics data is for discriminating the kind of program. Second table area 16 has twelve sectors for mode 1, similar to first table area 14.

Referring to FIG. 7, first data area 18 in which a plurality of first programs are sequentially recorded according to index number, has a start address (D). In each first program, still image data is recorded. Image data of 360 pixels×240 lines are compressed as 2-byte pixel data consisting of a start bit (1 bit) and RGB555 code (15 bits) and 2-byte run-length data consisting of a continuation bit (1 bit) and run-length code (15 bits) and then the compressed data is recorded in first data area 18. Therefore, in the first program, (360×240× 2)/2,048=84.37 sectors are required for performing RGB555 coding. In the meantime, when run-length coding is performed, 84.37 sectors can be compressed into approximately 40 sectors for a natural image and into five sectors for a graphics image. Accordingly, when a natural image of 4000 cuts are recorded, a 400 Mb memory capacity is required.

Figure 8:
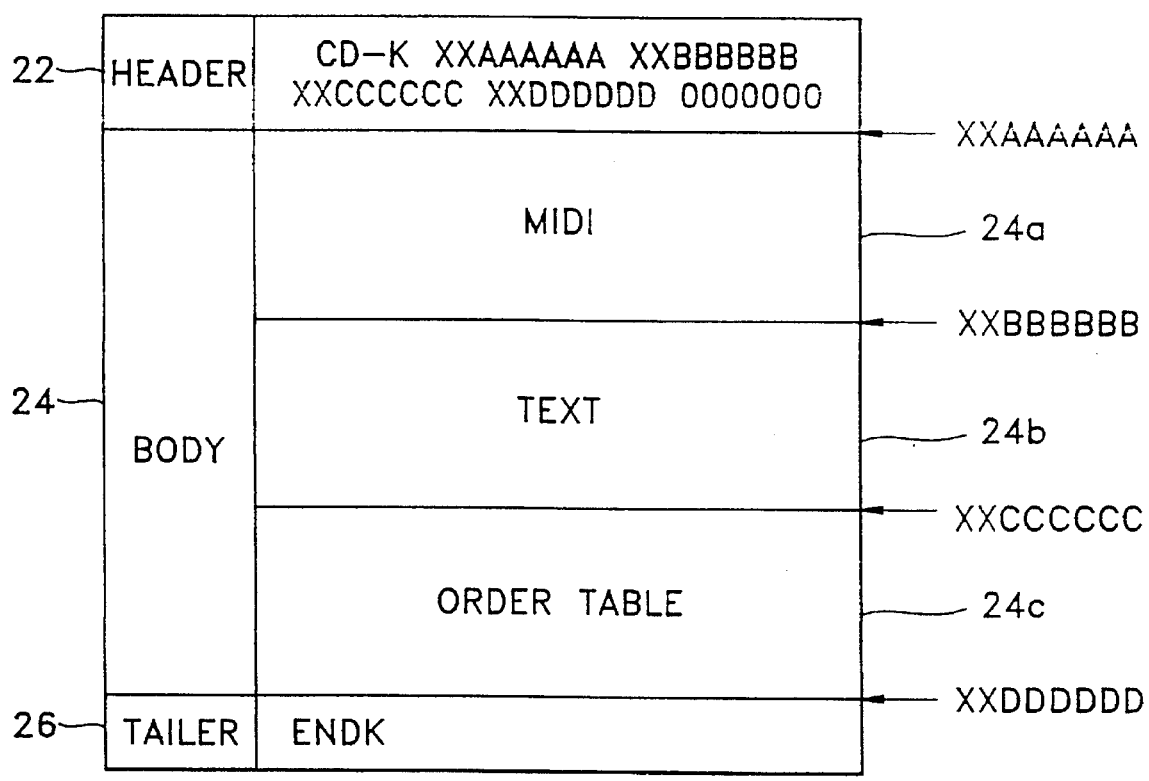
FIG. 8 illustrates a format of a second program recorded in the second data area of FIG. 3.

Referring to FIG. 8, second data area 20, in which a plurality of second programs are recorded sequentially according to index number, has a start address (E). Each second program includes start address data recorded onto second index table 14. The second program consists of a header 22, a body 24 and a tailer 26. Header 22 has a plurality of pointers for designating CD-K discriminating data, a start address of body 24 and a start address of tailer 26. Body 24 has second data 24a and 24b and a first index data 24c of the first programs related to the second data. For example, if first data is MIDI data of a certain musical piece, the first index data is for accessing the corresponding first programs of the first data area in order to construct a background screen which changes for every measure of the musical piece. The first data may include text data 24b or font data thereof in addition to MIDI data 24a. Here, text data 24b is lyrical data of the musical piece, and the font data may be Hangul (Korean alphabet) font, Japanese character font, Chinese character font, English font, etc.

Figure 9:
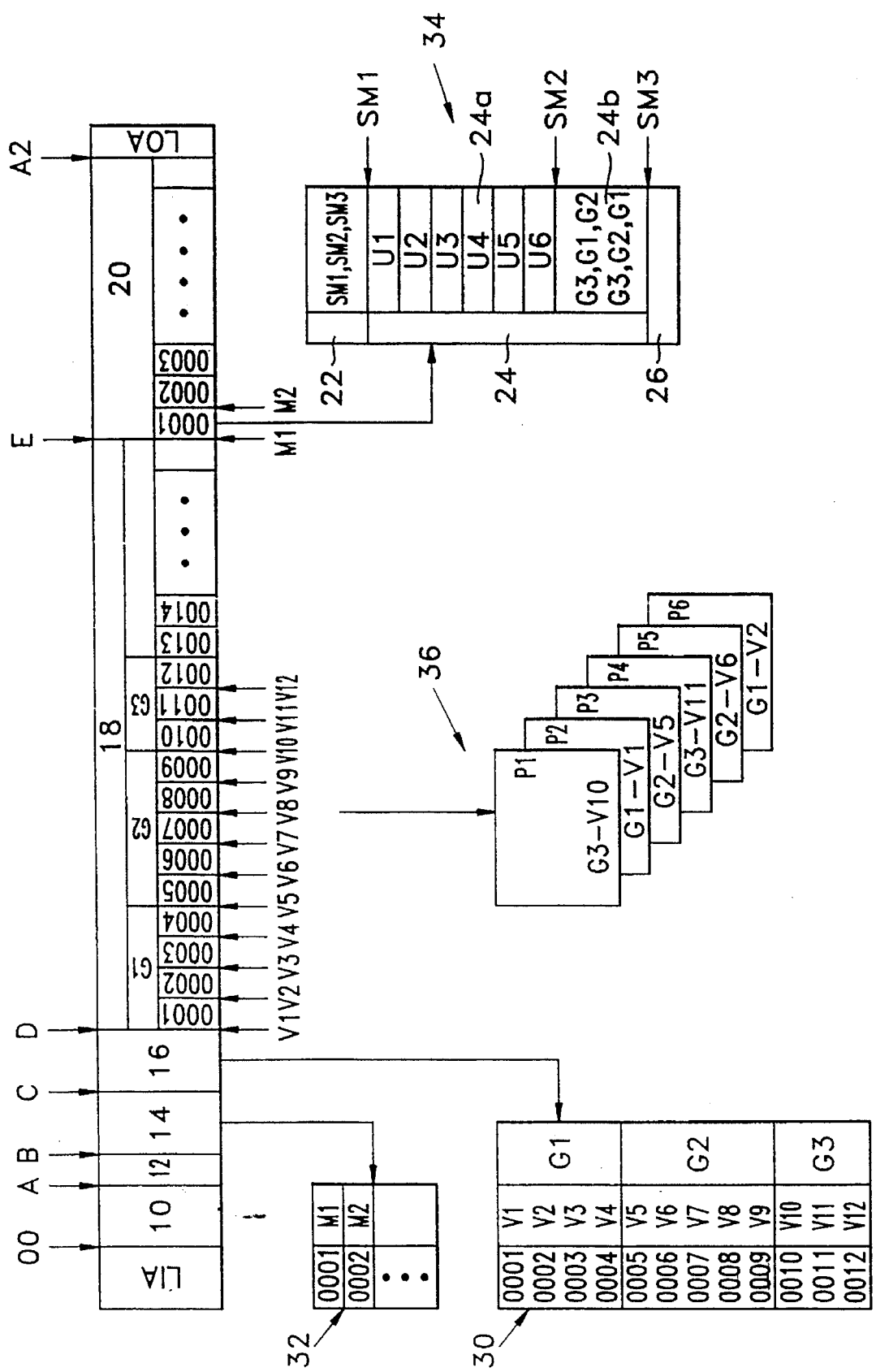
FIG. 9 illustrates a method for reproducing data from the disk recording medium of embodiment 1.

A data reproduction method from the disk recording medium of embodiment 1 having such a signal format can be explained with reference to FIG. 9.

First, the TOC is read from the LIA of the disk recording medium in the early stage of the reproduction, and the start address data (00) of the program area (PMA) is obtained, and first and second index tables are sequentially read from first and second table areas 14 and 16 and stored respectively into first and second memories 30 and 32. For example, if number 1 of the second program is selected, address M1 of the second index (0001) corresponding to the selected number refers to the second index table stored in second memory 32. Then, the corresponding second program of second data area 20 having address M1 as a start address is read from second data area 20 of the disk recording medium and stored in a third memory 34. The index address corresponding to the first index (0010-0001-0005-0011-0006-0002) that accords to the order (G3-G1-G2-G3-G2-G1) of second data 24b stored in third memory 34 by a pointer value (SM2) for designating start address of index data from header 22 of the second program refers to the first index table stored in first memory 30. Then, first programs corresponding to first data area 18 having the addresses (V10-V1-V5-V11-V6-V2) resulting from the reference as a start address are sequentially read from first data area 18 of the disk recording medium and stored in a fourth memory 36. First data (P1-P2-P3-P4-P5-P6) stored in fourth memory 36 related to second data (U1-U2-U3-U4-U5-U6) stored in third memory 34 are digital-to-analog converted, synchronized and output.

Figure 10:
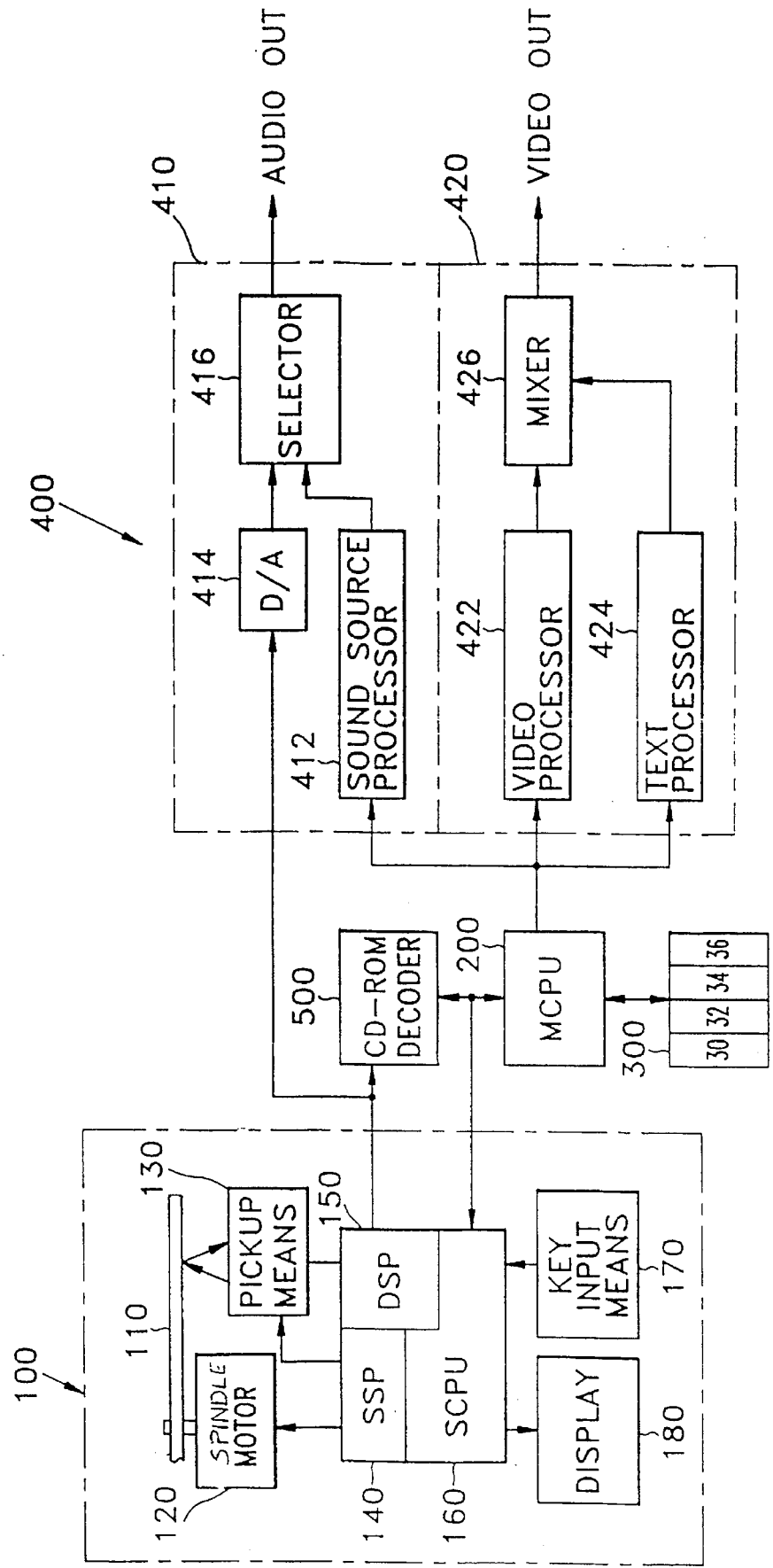
FIG. 10 is a block diagram showing a reproduction apparatus for playing back a disk recording medium of the present invention.

Referring to FIG. 10, a data reproduction apparatus from a disk recording medium of the present invention is constituted to be compatible with a conventional CD. The data reproduction apparatus of the present invention includes CD reproduction means 100, a CD-ROM decoder 500, a main central processing unit (CPU), a memory 300 and a signal converter 400. CD reproduction means 100 of the present invention is constructed similar to a conventional CD reproduction means in view of the following points. CD reproduction means 100 picks up from disk 110 the data signal which is optically modulated via pickup means 130. A digital signal processor (DSP) means 150 decodes the result and outputs the decoded CD data signal. Then, a program selection signal resulting from key-input of key input means 170 is generated by microcomputer 160. In addition, servo means 140 performs a tracking servo of a spindle motor 120 and pickup means 130. Reference numeral 180 denotes a display. Decoder 500 receives the CD reproduction signal and descrambles the received signal. Then, predetermined error detection and error correction are performed on the resultant signal, to thereby output data. Decoder 500 is for decoding a data signal of mode 1 format of CD-ROM data received from the CD reproduction signal. Main CPU 200 outputs data and index table information from input data and transmits start address data of the corresponding program to microcomputer 160 in response to a program selection signal transmitted from microcomputer 160. Then, the data signal of the selected program is output. Memory 300 stores first index table into first memory 30, second index table into second memory 32, second data of the selected program and order table into third memory 34, and first data of the first program according to the order table into fourth memory 36, i.e., video RAM. Here, first to third memories are RAMs. Signal converter 400 converts the read-out first and second data signal into a predetermined reproduction output signal and outputs the result to an output device. Signal converter 400 can be roughly divided into an audio output portion 410 and a video output portion 420. Audio output portion 410 comprises a MIDI sound source processor 412 for receiving a second data and outputting an audio signal, a D/A converter 414 for converting a CD-DA signal and a selector 416. Video output terminal 420 comprises a video processor 422 for receiving a first data and outputting a television signal, a text processor 424 for receiving text data that can be included among the second data and generating a text image signal and a mixer 426 for mixing the television signal and the text image signal so as to output a video signal.

As described above, in the data reproduction apparatus of the present invention, the data signal position of a disk can be recognized by a microcomputer (e.g., MCPU 200) and a control processor (e.g., signal converter 400). Therefore, when outputting the current signal, the next signal can be picked up to be on standby so that a high speed access is accomplished. In addition, production cost can be reduced and data can be reproduced from a conventional CD-DA disk since an additional operating system is not needed.

Embodiment 2

Figure 11:
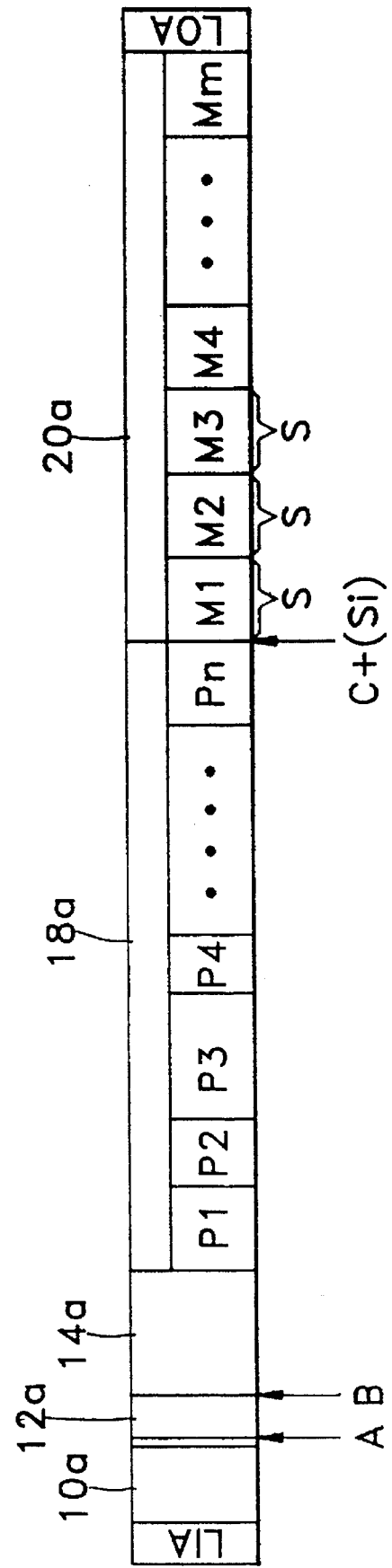
FIG. 11 illustrates a format of a program area of a compact disk of embodiment 2 of the present invention.

Referring to FIG. 11, the program area of recording medium of embodiment 2 according to the present invention includes a disk label area 10a of a CD-ROM, a disk area 12a, a table area 14a, a first data area 18a and a second data area 20a. Different from embodiment 1, embodiment 2 has a single table area. At least one CD-DA track can be included between second data area 20a and the LOA. In such a case, a pointer and an address of the track are additionally provided in the TOC. Table area 14a consists of a table made up of number, start address and characteristic data of each first program of first data area 18a. Table area 14a has a start address (B). Each start address of the second program consists of 2-byte index data, 1-byte minute data, 1-byte second data and 1-byte frame data. The 1-byte characteristic data is for displaying a group of the first programs. The number of the required sectors can be calculated as (6 bytes×4,000 programs)/2,048=11.78. Therefore, twelve sectors are required for mode 1 of CD-ROM format. First programs P1–Pn are sequentially recorded in first data area 18a according to index number. Second programs having a predetermined and identical size (S) are recorded into second data area 20a. However, as shown in FIG. 8, each second program comprises header 22, body 24 and tailer 26. A start address value of the second programs can be calculated by the following expression:

$$MAi=C+S(i-1) \quad (1)$$

Here, C is a start address value of the second data area and S is the size of the second program. C and S can be predetermined in the TOC of the LIA. For example, minutes data of pointers A1 and A2 of FIG. 2 is maintained without change, and seconds and frame data can be set as the value of C and S or can be established in an operation program of a reproduction apparatus. Therefore, in embodiment 2, the start address of the second program can be calculated by an operation without an additional index table and then accessed.

Figure 12:
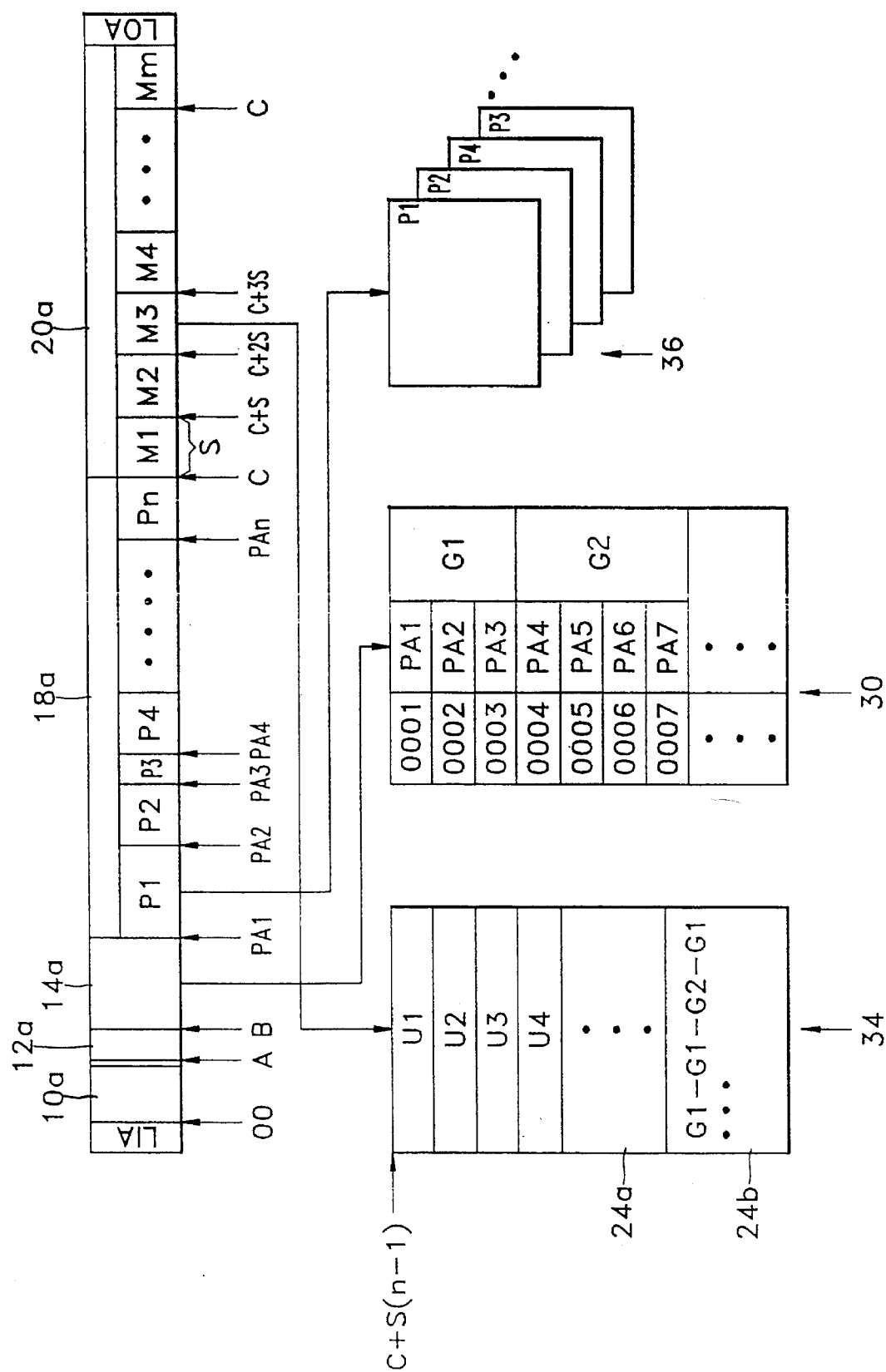
FIG. 12 illustrates a method for reproducing data from the disk recording medium of embodiment 2.

A data reproduction method from a disk recording medium having the above-described signal format will be explained with reference to FIG. 12.

A data reproduction method from a disk recording medium of the present invention is as follows. The TOC is read from the LIA of the disk recording medium in the early stages of reproduction, to obtain start address data (00 minutes; 00 seconds; 00 frames) of a program area. Then, disk data and index table data are read from disk area 12a and table area 14a having start addresses (A and B) of the start address data, and the index table is stored in first memory 30. Then, for example, if number 3 of second program is selected, an address (MA3) corresponding to the selected number (i=3) of the second program (M3) is calculated by the above expression (1).

Accordingly, the second program (M3) having address MA3 calculated by the expression (1) as a start address is read from second data area 20a of the disk recording medium and stored in third memory 34. Second programs (M1, M2, M3, M4 . . . ) having C, C+S, C+2S, C+3S, i.e., the result of the expression (1), as a start address are sequentially read from second data area 20a of the disk recording medium according to order (G1-G1-G2-G1 . . . ) of order table 24c which is stored in third memory 34 by a pointer value for designating the start address of the order table using header 22 of the second program, and stored in fourth memory 36. Then, the first data (P1) stored in fourth memory 36, which is related to the second data (U1) stored in third memory 34, is digital-to-analog converted, synchronized and output. First and second data are output by the same method as the above until an output of the second data ends.

Embodiment 3

Figure 13:
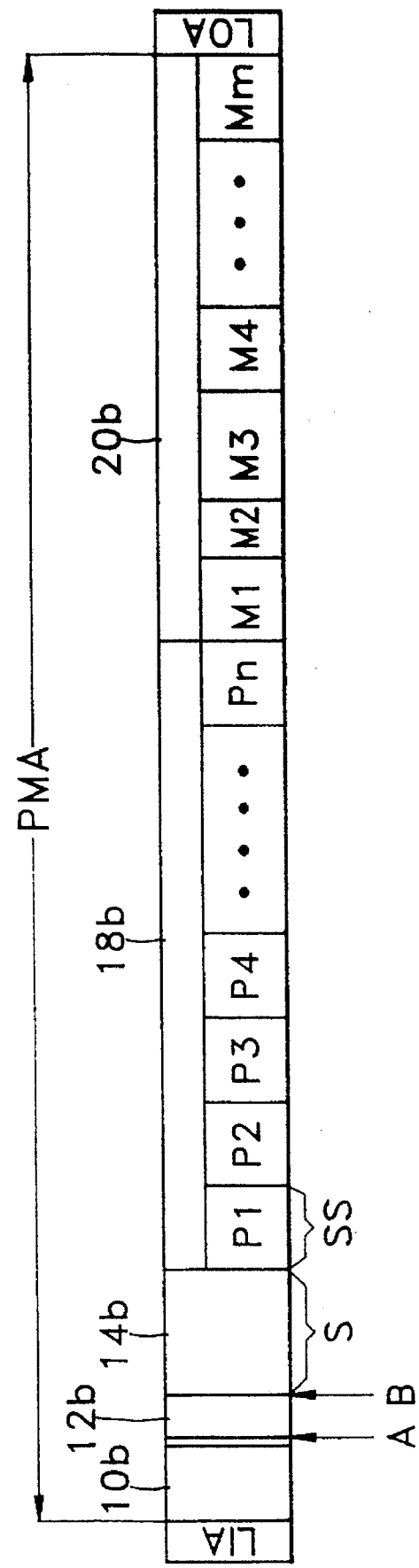
FIG. 13 illustrates a format of a program area of a compact disk of embodiment 3 of the present invention.

Referring to FIG. 13, program area of the present invention roughly includes CD-ROM disk label area 10b, disk description area 12b, table area 14b, first data area 18b and second data area 20b. At least one CD-DA track can be included between second data area 20b and LOA. In such a case, a pointer and address of the track is additionally provided in the TOC. Table area 14b has a predetermined size (S) of twelve sectors. First programs (P1, P2, P3 . . . Pn) having a predetermined size (SS) are sequentially recorded in first data area 18b according to index number. In embodiment 3, the size (SS) of the first programs is set the same (for example, 40 sectors). All the portions having no data among 40 sectors have zero value. Therefore, the start address of the first program having the same size (SS) can be calculated by the following expression.

$$PAi=S+SS(i-1) \quad (2)$$

Therefore, each start address of the first programs can be obtained by the expression (2) using the start address (B) of table area 14b. Thus, program location can be recognized and access to the program location is possible without an additional index table.

Figure 14:
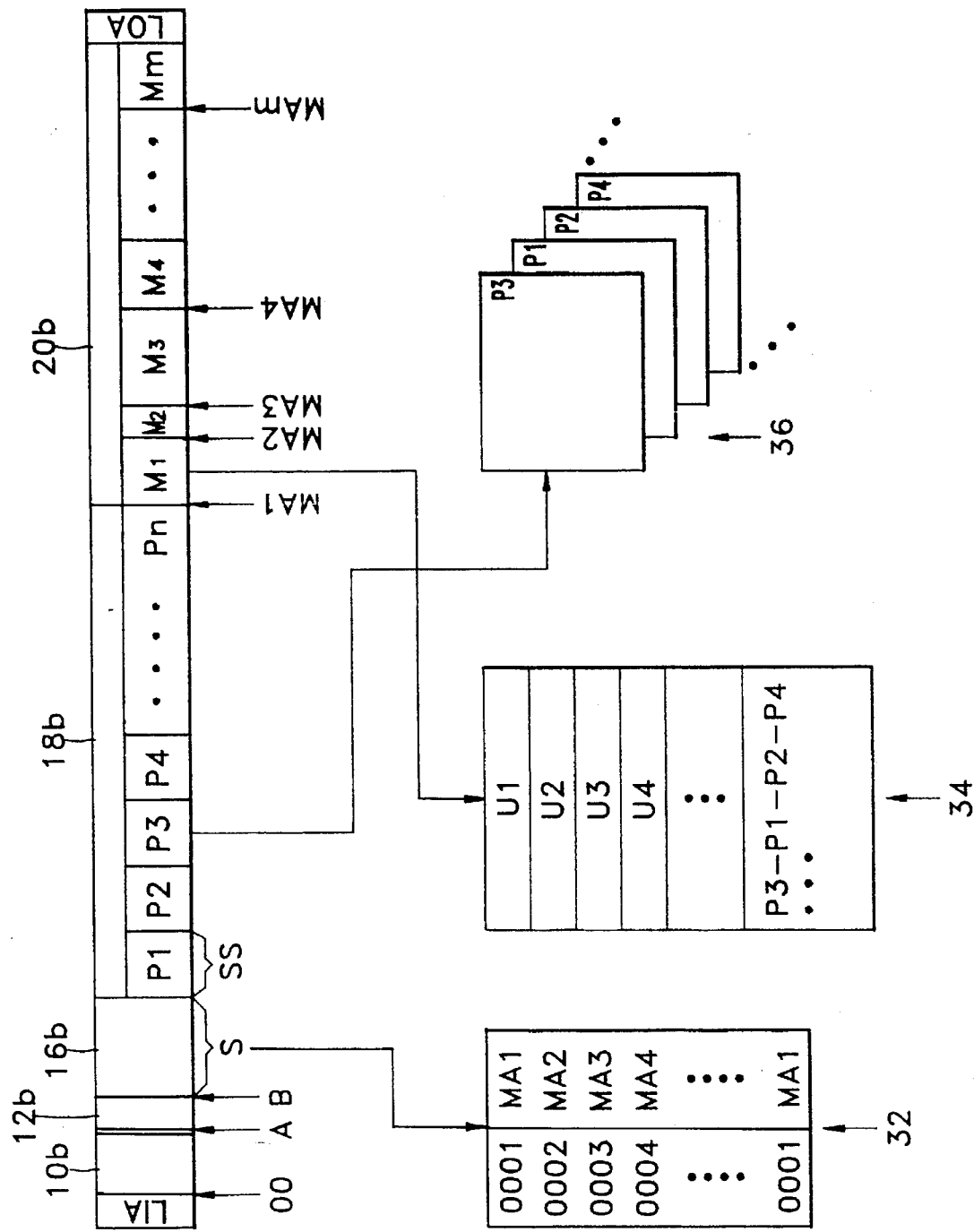
FIG. 14 illustrates a method for reproducing data from the disk recording medium of embodiment 3.

A data reproduction method from a disk recording medium of embodiment 3 having such a signal format will be explained with reference to FIG. 14.

The TOC is read from the LIA of the disk recording medium in the early stages of the reproduction so as to obtain start address data (00 minutes 00 seconds 00 frames) of the PMA. Disk description data and an index table are read from disk description area 12b and table area 14b having start addresses A and B using the start address (00), and stored in second memory 32. Then, if number 1 of the second program is selected, the address (MA1) of the index (0001) corresponding to the selected second program number refers to the index table stored in second memory 32. Then, the second program (M1) corresponding to second data area 20a having address MA1 as a start address is read from second data area 20a and stored in third memory 34. First programs (P3, P1, P2, P4 . . . ) having S+2SS, S+SS, S, i.e., the result of the expression (2), as a start address are sequentially read from first data area 18b of the disk recording medium according to the order (P3-P1-P2-P4 . . . ) of order table 24b which is stored in third memory 34 by a pointer value for designating the start address of the index table using header 22 of the second program, and stored in fourth memory 36. Then, the first data (P4) stored in fourth memory 36, which is related to the second data (U1) stored in third memory 34 is digital-to-analog converted, synchronized and output. First and second data are output by the same method as the above until an output of the second data ends.

Embodiment 4

Figure 15:
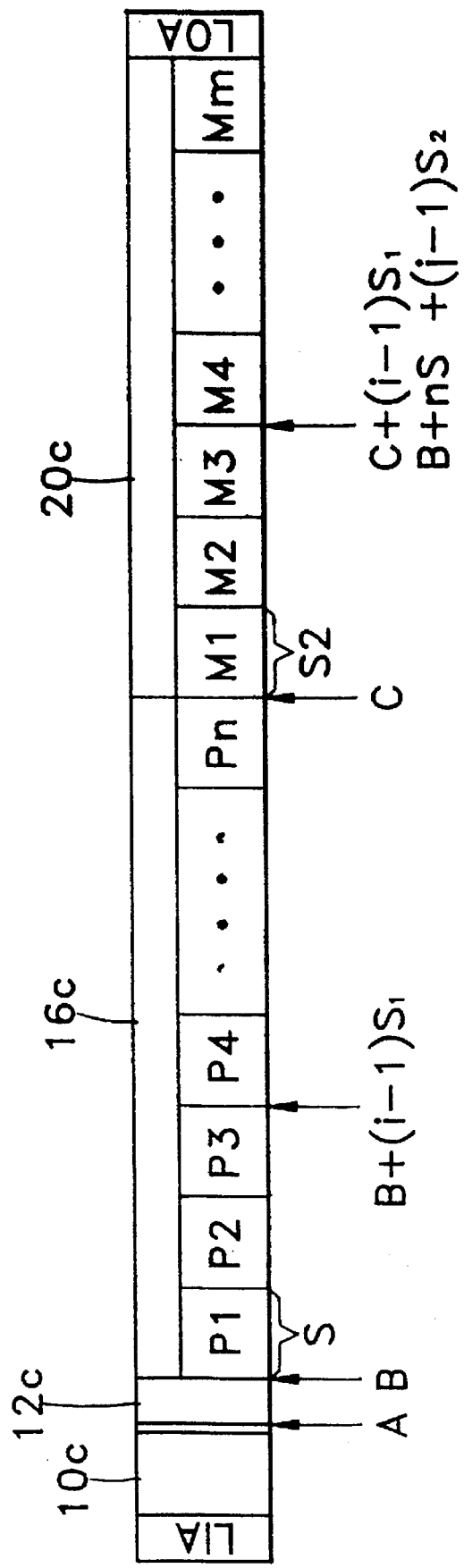
FIG. 15 illustrates a format of a program area of a compact disk of embodiment 4 of the present invention.

The PMA of recording medium of embodiment 4 of the present invention roughly includes CD-ROM disk label area 10c, disk description area 12c, first data area 18c and second data area 20c, as shown in FIG. 15. In other words, a table area is not additionally provided, and the start address of each program is calculated by an operation. First programs (P1–Pn) are sequentially recorded in first data area 18c according to record number. First programs are fixed into the same size (S1), for example, 40 sectors. Therefore, the start address of each first program can be calculated by the following expression:

$$PA_i = B + S1(i-1) \tag{3}$$

Second programs having the predetermined same size (S2) are recorded in second data area 20c. Therefore, the start address of the second programs can be calculated by the following expression:

$$MA_j = C + S2(j-1) \tag{4}$$

Here, C is a start address value of the second data area, and S2 is the size of the second program. In addition, B & C, S1 & S2 can be set in the TOC of the LIA. For example, minutes data of pointers A1 and A2 in FIG. 2 is maintained without change, and seconds and frame data can be set as B & C and S1 & S2 which can be otherwise set in an operation program of a reproduction apparatus. Therefore, in the present invention, the start addresses of first and second programs can be calculated by an operation with no additional index table, and access to the start addresses is gained. In addition, the start address of the second program can also be calculated by the following expression:

$$MA_j = (B + nS1) + S2(j-1) \tag{5}$$

Here, n is the number of first programs.

In a data reproduction method from the disk recording medium of embodiment 4 having such a signal format, the TOC is read from the LIA of the disk recording medium in the early stages of reproduction operation so as to obtain a start address data (00 minutes; 00 seconds; 00 frames) of the PMA.

An address of the selected second program (Mj) is calculated by the expression (4), and the second program (Mj) of the jth entry having the calculated address as a start address is read from second data area 20c having a predetermined second start address (C) and stored in third memory 34.

Record index (i) of the first program is read from the second program stored in third memory 34 according to a record index table. Then, an address of the first program (Pi) corresponding to the record index (i) is calculated by expression (3). Then, the first program (Pi) of the ith entry is read from first data area 18c having a predetermined first start address (B) and stored in fourth memory 36. The second data of the second program stored in third memory 34 and the first data of the first program stored in fourth memory 36 are digital-to-analog converted, synchronized and output. First and second data are output by the same method as the above until an output of the second data ends.

In the disk recording medium of the present invention, all data signals for each program are not recorded but the fundamental data signal components constituting all programs are recorded, in a separate area. Then, each program is made up of an index according to a data signal components sequence, to thereby remove redundant data. Thus, more programs can be recorded in a disk, and tables of programs and data are recorded into the PMA. As a result, programs several tens times more than 99 programs of the TOC and index tables thereof can be recorded.

According to such a data reproduction method of the present invention, the time period for reading the TOC from the LIA is extremely short. In addition, it can be recognized where on a disk the data signal of the program is positioned. Therefore, the next data signal is read and is available on standby when the current data signal is output. Thus, access to the signal which is reproduced from a disk can be performed at a high speed. In addition, a data address can be read via a table by a microcomputer or a processor, thereby removing the necessity of an additional operating system or application program.

As described above, in the present invention, a storage efficiency of a disk can be maximized since more programs can be stored in a single disk. Moreover, a data address on a disk can be read by a microcomputer or a processor without an additional operation system. Thus, high speed accessing is possible and production costs can be kept low.

In addition, in the present invention, the data signal consists of a still image group, sound source group and font group, and a program can be constituted by a data signal sequence read from the above-mentioned three groups, to thereby satisfy the request for various programs in each application field. In other words, the present invention can be applied to entertainment programs such as games, karaoke, and musical and educational programs such as dialogue type education and animated fairy tales; electronic publishing programs such as an electronic dictionary; electronic magazines and books and other programs such as catalog advertisements. Also, tours and portable electronic maps are possible. That is, more low-cost programs can be provided to a single disk, considering the drawbacks of a conventional CD-ROM and CD-I.

What is claimed is:

1. A disk recording medium having a lead-in area, a program area and a lead-out area, wherein said program area comprises:

a first table area whose start address is a first address value determined by a start address of said program area, and where a first index table consisting of a plurality of first indices and address data are recorded;

a second table area whose start address is a second address value determined by the start address of said program area, and where a second index table consisting of a plurality of second indices and address data are recorded;

a first data area where a plurality of first programs whose start address is determined by address data of the corresponding first index among said first indices of said first table area consisting of first data are recorded according to an order of the plurality of first indices of said first index table; and a second data area where a plurality of second programs whose start address is determined by address data of the corresponding second index among said second indices of said second table area consisting of second data and an order table of said first programs related to said second data are recorded according to an index of the plurality of second indices of said second index table.

2. A disk recording medium according to claim 1, wherein said first data is image data.

3. A disk recording medium according to claim 2, wherein said image data is RGBnnn-coded and compressed according to a run-length method.

4. A disk recording medium according to claim 1, wherein said second data is at least one of MIDI data, text data and font data.

5. A disk recording medium according to claim 1, wherein said program area further comprises, between a disk label area of CD-ROM format and said first table area, a disk description area whose start address is determined by the start address of said program area as a fifth address value and where disk description data is recorded.

6. A method for reproducing a disk recording medium having a lead-in area, a program area including first and second table areas and first and second data areas, and a lead-out area, said method comprising the steps of:

reading TOC data from said lead-in area of said disk recording medium to obtain start address data of said program area, reading first and second index tables from said first and second table areas having first and second start addresses predetermined by said start address data, and respectively storing said first and second index tables in first and second memories;

reading an address of a second index corresponding to a selected number with reference to said second index table stored in said second memory, reading a corresponding second program having the read address of said second index as a start address from said second data area, and storing said corresponding second program in a third memory;

reading a first index according to an order table of said corresponding second program stored in said third memory, reading an address of said first index with reference to said first index table in said first memory, reading a corresponding first program having said read address of said first index as a start address from said first data area, and storing said corresponding first program in a fourth memory; and performing digital-to-analog conversion on second data of said second program stored in said third memory and on first data of said first program stored in said fourth memory, and synchronizingly outputting the converted first and second analog signals.

7. A disk recording medium having a lead-in area, a program area and a lead-out area, wherein said program area comprises:

a table area whose start address is a first address value determined by the start address of said program area, and where an index table consisting of a plurality of indices and address data is recorded;

a first data area for recording a plurality of first programs whose start address is address data of the corresponding index among said plurality of indices of index tables of said table area, consisting of first data according to an order of the plurality of indices of said index table; and a second data area for recording a plurality of second programs consisting of second data and an order table of said first programs related to said second data and having a predetermined size, a start address of each of said plurality of second programs being a second address value determined by the start address of said program area.

8. A method for reproducing a disk recording medium having a lead-in area, a program area including first and second data areas, and a lead-out area, said method comprising the steps of:

reading TOC data from said lead-in area of said disk recording medium to obtain start address data of said program area, reading an index table from said program area having a start address determined by said start address data of said program area, and storing said index table in a first memory;

calculating a start address MAi of a second program corresponding to a selected number i by the equation $$MAi=C+S(i-1)$$

where C is a predetermined start address value of the second data area and S is a constant size of the respective second programs;

reading the second program having said calculated address value as a start address from said second data area, and storing said read second program in a second memory;

reading an index of a first program according to an order table of said second program stored in said second memory, reading a start address of the first program corresponding to said read index with reference to said index table stored in said first memory, reading the first program having the read address as a start address from said first data area, and storing said read first program in a third memory; and performing digital-to-analog conversion on second data of said second program stored in said second memory and on first data of said first program stored in said third memory, and synchronizingly outputting the converted first and second analog signals.

9. A disk recording medium having a lead-in area, a program area and a lead-out area, wherein said program area comprises:

a table area whose start address is a first address value determined by the start address of said program area, and where an index table having a predetermined first size (S) and consisting of a plurality of indices and address data is recorded;

a first data area for recording a plurality of first programs, each of said first programs having a predetermined second size (SS) and consisting of first data; and a second data area for recording a plurality of second programs consisting of second data and an order table of said first programs related to said second data wherein a start address of each of said plurality of second programs is determined by address data of the corresponding index among said plurality of indices of said index table of said table area according to an order of a plurality of indices of said index table.

10. A method for reproducing a disk recording medium having a lead-in area, a program area including a table area having a predetermined size and first and second data areas, and a lead-out area, said method comprising the steps of:

reading TOC data from said lead-in area of said disk recording medium to obtain start address data of said program area, reading an index table from said table area having a start address determined by said start address data of said program area, said index table having a predetermined size, and storing said index table in a first memory;

reading an address of an index corresponding to a selected number with reference to said index table stored in said first memory, reading a second program having the read address as a start address from said second data area, and storing said read second program in a second memory;

reading an order (i) of a first program selected from a plurality of first programs according to an order table of said second program stored in said second memory, calculating a start address (PAi) of said first program of said order (i) given from start address of said table area by the equation $$PAi=S+SS(i-1)$$

where SS is a predetermined size of each of said plurality of first programs, reading the first program having the calculated address as a start address from said first data area, and storing said read first program in a third memory; and performing digital-to-analog conversion on second data of said second program stored in said second memory and on first data of the first program stored in said third memory, and synchronizingly outputting the converted first and second analog signals.

11. A disk recording medium having a lead-in area, a program area and a lead-out area, wherein said program area comprises:
- a first data area where a plurality of first programs consisting of first data having a predetermined size are recorded, each of said plurality of first programs having a second address value determined by the start address of said program area; and
- a second data area for recording a plurality of second programs consisting of second data and an order table of first programs related to said second data and having a predetermined size, and a start address of each of said second programs being a second address value determined by the start address of said program area.

12. A reproduction method of a disk recording medium having a lead-in area, a program area including first and second data areas, and a lead-out area, said method comprising the steps of:
- reading TOC data from said lead-in area of said disk recording medium to obtain absolute start address data of said program area;
- reading a second program (MAj) of a "j"th entry from said second data area having a second start address (C) determined by said absolute start address, calculating an address of a selected second program (MAj) by the equation $$MAj=C+S2(j-1)$$

where S2 is the size of the respective second programs, and storing said read second program in a first memory;
- reading an order (i) of a first program according to an order table of second programs stored in said first memory, calculating an address (PAi) of a first program (Pi) corresponding to the read order by the equation $$PAi=B+S1(i-1)$$

where S1 is the size of the first program, reading the first program (Pi) of the "i"th entry from said first data area having a first start address (B) determined by said absolute start address, and storing said read first program in a second memory; and
- performing digital-to-analog conversion on the second data of said second program stored in said first memory to produce a first analog signal and on the first data of the first program stored in said second memory to produce a second analog signal, and synchronizingly outputting the first and second analog signals.

* * * * *